United States Patent
Roos et al.

(10) Patent No.: US 12,548,991 B2
(45) Date of Patent: Feb. 10, 2026

(54) BUSBAR AND A VEHICLE COMPRISING SUCH A BUSBAR

(71) Applicant: Scania CV AB, Södertälje (SE)

(72) Inventors: Christer Roos, Rönninge (SE); Oscar Hällman, Södertälje (SE)

(73) Assignee: Scania CV AB, Södertälje (SE)

( * ) Notice: Subject to any disclaimer, the term of this patent is extended or adjusted under 35 U.S.C. 154(b) by 190 days.

(21) Appl. No.: 18/271,056

(22) PCT Filed: Jan. 21, 2022

(86) PCT No.: PCT/SE2022/050064
§ 371 (c)(1),
(2) Date: Jul. 6, 2023

(87) PCT Pub. No.: WO2022/164367
PCT Pub. Date: Aug. 4, 2022

(65) Prior Publication Data
US 2024/0072525 A1 Feb. 29, 2024

(30) Foreign Application Priority Data

Jan. 29, 2021 (SE) .................... 2150105-1

(51) Int. Cl.
*B60R 16/023* (2006.01)
*H01B 5/00* (2006.01)
(Continued)

(52) U.S. Cl.
CPC ......... *H02G 5/005* (2013.01); *B60R 16/0238* (2013.01); *H01B 5/00* (2013.01); *H02G 5/10* (2013.01)

(58) Field of Classification Search
CPC ..... B60R 16/0238; B60R 16/023; H01B 5/00; H02G 5/00; H02G 5/005; H02G 5/10
(Continued)

(56) References Cited

U.S. PATENT DOCUMENTS

| | | | | |
|---|---|---|---|---|
| 2,469,073 A | * | 5/1949 | McArthur | H02G 5/06 |
| | | | | 174/72 B |
| 3,601,525 A | * | 8/1971 | Oravec | H02G 5/025 |
| | | | | 174/61 |

(Continued)

FOREIGN PATENT DOCUMENTS

| | | | | |
|---|---|---|---|---|
| CN | 105322686 A | * | 2/2016 | ............ H02K 15/00 |
| CN | 207235333 U | | 4/2018 | |

(Continued)

OTHER PUBLICATIONS

Scania CV AB, International Patent Application No. PCT/SE2022/050064, International Preliminary Report on Patentability, Jul. 31, 2023.
(Continued)

*Primary Examiner* — Timothy J Thompson
*Assistant Examiner* — Guillermo J Egoavil
(74) *Attorney, Agent, or Firm* — Moore & Van Allen PLLC; W. Kevin Ransom

(57) ABSTRACT

A busbar comprising two or three more sheet-shaped conductors, wherein said conductors overlap each other and define an elongated body having a central channel, and wherein the conductors are separated by an electric isolation, and wherein each conductor has a surface exposed to the channel, and wherein the area of said surface of each conductor is equal the area of said surface of each of the other conductors.

11 Claims, 2 Drawing Sheets

(51) Int. Cl.
*H02G 5/00* (2006.01)
*H02G 5/10* (2006.01)

(58) Field of Classification Search
USPC ........................................... 174/68.2
See application file for complete search history.

(56) References Cited

U.S. PATENT DOCUMENTS

| | | | |
|---|---|---|---|
| 4,094,568 A * | 6/1978 | Lee .................... | G01R 31/2808 |
| | | | 439/74 |
| 9,270,091 B2 | 2/2016 | Erdle et al. | |
| 2012/0224296 A1* | 9/2012 | Hardin ................ | H05K 3/4046 |
| | | | 361/301.4 |
| 2016/0097960 A1* | 4/2016 | Dixit ................... | B23K 26/082 |
| | | | 702/167 |
| 2016/0196896 A1 | 7/2016 | Yang et al. | |

FOREIGN PATENT DOCUMENTS

| | | |
|---|---|---|
| CN | 105493367 B | 5/2018 |
| CN | 208316585 U | 1/2019 |
| CN | 208386458 U | 1/2019 |
| CN | 110254247 A | 9/2019 |
| CN | 110648782 A | 1/2020 |
| DE | 102006032882 A1 | 1/2008 |
| EP | 2107659 A1 | 10/2009 |
| EP | 3588712 A1 | 1/2020 |
| FR | 2495388 A1 | 6/1982 |
| GB | 662173 A | 12/1951 |
| JP | 50106699 U | 9/1975 |
| JP | 2010016945 A | 1/2010 |
| NZ | 293885 A | 9/1998 |
| WO | 2010018099 A1 | 2/2010 |
| WO | 2018223484 A1 | 12/2018 |
| WO | 2020050046 A1 | 3/2020 |

OTHER PUBLICATIONS

Scania CV AB, European Patent Application No. 22746348.6, Extended European Search Report, Nov. 20, 2024.
Zhang, M., "Demystifying EMC in an Electric Vehicle's Drive Unit", Interference Technology, Aug. 11, 2020, 21 pages, https://web.archive.org/web/20200811184832/https://interferencetechnology.com/demystifying-emc-in-an-electric-vehicles-drive-unit/.
Scania, "Battery Electric Truck", Oct. 30, 2020, 4 pages, https://web.archive.org/web/20201030110213/https://www.scania.com/group/en/home/products-and-services/trucks/battery-electric-truck.html.
Scania CV AB, International Patent Application No. PCT/SE2022/050064, International Search Report, Mar. 25, 2022.
Scania CV AB, International Patent Application No. PCT/SE2022/050064, Written Opinion, Mar. 25, 2022.
Scania CV AB, Swedish Patent Application No. 2150105-1, Office Action, Oct. 22, 2021.

* cited by examiner

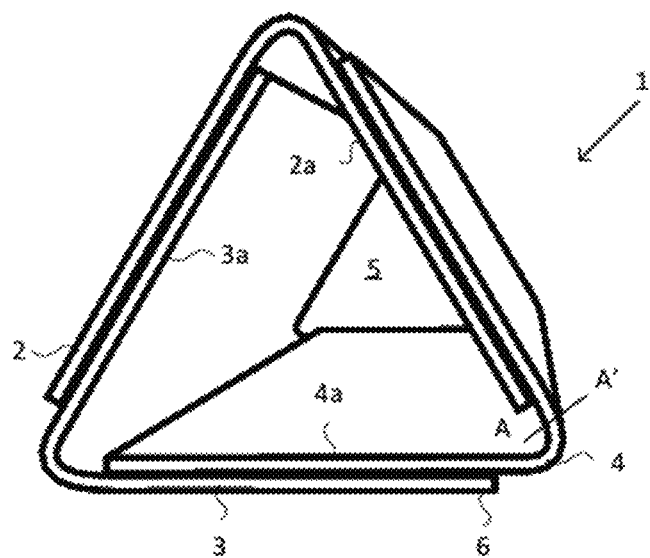
Fig. 1
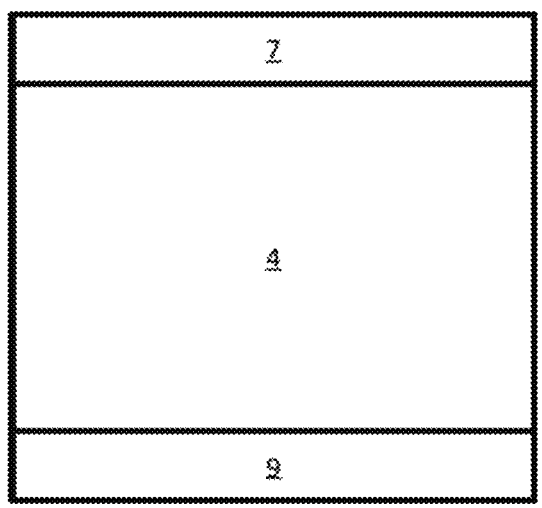
Fig. 2 A-A'

BUSBAR AND A VEHICLE COMPRISING SUCH A BUSBAR

CROSS-REFERENCE TO RELATED APPLICATIONS

This application is a National Stage Patent Application (filed under 35 § U.S.C. 371) of PCT/SE2022/050064, filed Jan. 21, 2022, of the same title, which, in turn claims priority to Swedish Patent Application No. 2150105-1 filed Jan. 29, 2021, of the same title; the contents of each of which are hereby incorporated by reference.

TECHNICAL FIELD

The present invention relates to busbars in general, and in particular to busbars used in vehicles for the purpose of delivering power from a power source, such as a battery, to electrical components of the vehicle.

BACKGROUND

Transmission of high currents lead to high temperatures due to losses in busbars.

If one of the ends of a busbar is connected to a heat-source (i.e. heater or electric machine) this heat will be transferred to the other end of the busbar.

Both of the above mentioned issues might cause problems if the part connected in the other end (i.e. inverter or battery) doesn't withstand the heat.

The conductors of contemporary busbars are stacked on each other. This will result in unsymmetrical cross capacitance between conductors and the conductors in the middle will have a higher temperature (poor cooling capabilities).

OBJECT OF THE INVENTION

It is an object of the invention to present a busbar having a design that reduces the above-mentioned problems.

SUMMARY

The object of the invention is achieved by mean of a busbar comprising two or more sheet-shaped conductors, wherein said conductors overlap each other and define an elongated body having a central channel, and wherein the conductors are separated by an electric isolation, and wherein each conductor has a surface exposed to the channel, and wherein the area of said surface of each conductor is equal to the area of said surface of each of the other conductors.

By designing the busbars in an interlaced manner creating a channel between the busbars, a cooling media could be used within the interlaced busbars for cooling of the busbar. In the middle of the conductors there will be an area where the cooling media will be flowing and each conductor has the same mantle area in contact with the cooling media.

According to one embodiment, said surfaces exposed to the channel are covered by an electric isolation. Thereby, an electrically conducting cooling medium, such as water, may be used without risk of having a short circuit between the conductors via the cooling medium.

The proposed design is adding the possibilities of: Improved cooling, high mantle to cross area ratio, possibility to flow cooling media in between the busbars, reduction of the leakage field, cancellation of the magnetic field induced from current, symmetrical capacitance between busbars, and possibilities to make high current outlets, e.g. for bolt connection of the busbar while maintaining the same cross section area as the conductor itself.

According to one embodiment, said busbar comprises three or more conductors and that the overlap between each pair of conductors is equal.

Designing the busbars in an interlaced manner having the same overlap area between each busbar will result in a symmetrical cross capacitance between each busbar. By designing the busbars in an interlaced manner, the magnetic field induced by current is canceled as long as the sum of currents through the busbars are zero. By designing the busbars in an interlaced manner the leakage field is reduced in all current loops for a AC or DC system.

According to one embodiment, the body is a tubular body that has a symmetric cross-section.

According to one embodiment, the busbar comprises three conductors, wherein the tubular body defined by said overlapping conductors has a triangular cross-section. Preferably, such a busbar is a three-phase busbar. According to one embodiment, each sheet-shaped conductor has parallel longitudinal edges and is folded along a centerline between said edges.

According to one embodiment, said centerline defines a corner of the triangular cross-section.

The object of the invention is also achieved by means of a vehicle comprising an electric system comprising
a load, and
power electronics, wherein the load is connected to the power electronics via a busbar as defined hereinabove or hereinafter.

According to one embodiment, the load is a three phase load.

According to one embodiment, the vehicle comprises a cooling fluid circuit connected to the busbar and configured to provide a cooling fluid in said channel defined by the busbar.

Further features and advantages of the invention will be presented in the following detailed description of embodiments.

BRIEF DESCRIPTION OF THE DRAWING

FIG. 1 is a perspective view of an embodiment of the present invention, and

FIG. 2 is a cross-section of a conductor shown in FIG. 1.

DETAILED DESCRIPTION

Figure 3:
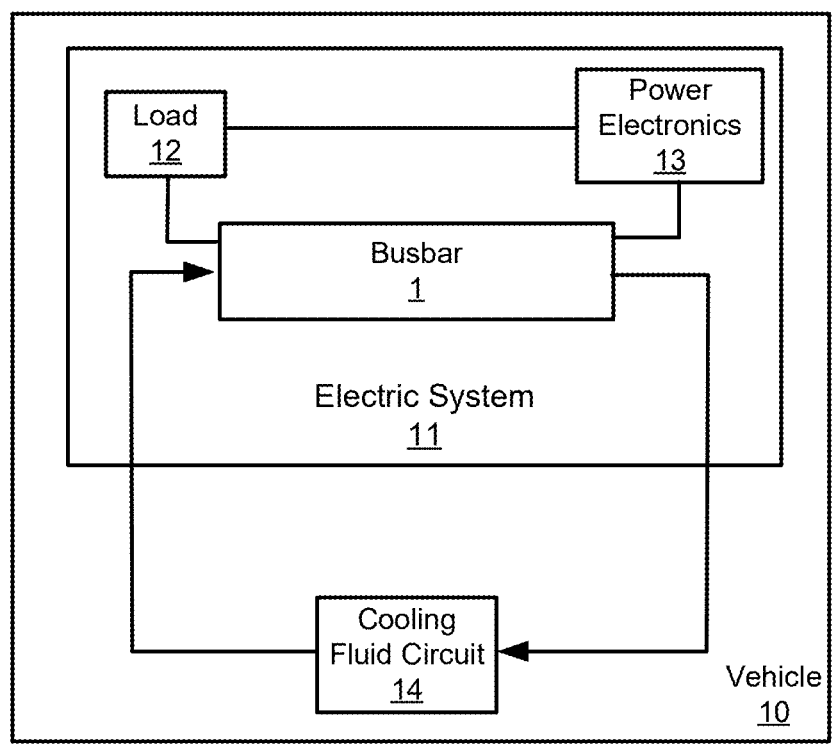
FIG. 3 is a depiction of a conductor according to the present invention connected to a cooling system.

FIG. 1 shows a busbar 1 comprising three sheet-shaped conductors 2, 3, 4, made of an electrically conducting material such as copper. The conductors 2, 3, 4 overlap each other and define an elongated body having a central channel 5. Only pairs of conductors overlap each other. In other words, a conductor is only overlapped by at most one other conductor at each single position. Each conductor is overlapped by the two other conductors, but at different parts of the conductor in question.

The conductors are separated by an electric isolation 6. For example, each sheet-shaped conductor 2, 3, 4 may be provided with a dielectric layer, preferably a polymer, forming said electric isolation 6. The dielectric layer forming said electric isolation 6 may be provided on the inside of or on both sides of the conductors 2, 3, 4. As an alternative, the electric isolation 6 may be applied by casting a polymer into the gaps between the conductors 2, 3, 4 while holding the latter in a fixed position in relation to each other, i.e. the position in which they overlap each other and define said channel 5.

Each conductor 2, 3, 4 has a surface 2a, 3a, 4a exposed to the channel 5, in the meaning that said surface 2a, 3a, 4a is not covered by any of the other conductors 2, 3, 4. The wording exposed to should be interpreted as to mean facing. However said surface 2a, 3a, 4a is covered by electric isolation 7, preferably formed by the same dielectric layer on each conductor 2, 3, 4 that is used for forming the electric isolation 6 between the conductors 2, 3, 4.

The area of said surface 2a, 3a, 4a of each conductor 2, 3, 4 is equal to the area of said surface of each of the other conductors 2, 3, 4.

The degree of overlap of the conductors 2, 3, 4 will determine the capacitance of the busbar 1. In the embodiment shown, the overlap is a maximum overlap, wherein substantially the total area of the each conductor 2, 3, 4 is overlapped by the two other conductors 2, 3, 4. The overlap between each pair of conductors is equal to the overlap of the other pairs. In other words, half the area of a conductor is overlapped by a first of the other conductors, the other half is overlapped by a second of the other conductors.

In the embodiment shown, the body defined by said overlapping conductors 2, 3, 4 has a triangular cross-section. Each side of the triangle, as seen in said cross-section has the same length as the other sides. Each conductor 2, 3, 4 defines two of the three legs of the triangle defined by said body, as seen in said cross-section. In other words, as seen in cross-section, each sheet-shaped conductor 2, 3, 4 has parallel longitudinal edges and is folded along a centerline between said edges. Said centerline defines a corner of the triangular cross-section.

Other cross-sectional shapes may also be applied within scope of the present invention. The number of sides of the busbar formed by the conductors may be increased up to a number such that the cross-section appears to be circular rather than triangular (while the number of conductors is still three). The cross-section may in fact be fully circular.

The busbar 1 is preferably arranged in a vehicle 10 comprising an electric system 11 comprising a load 12 and power electronics 13, wherein the load is connected to the power electronics via the busbar. The load is a three phase load. The vehicle comprises a cooling fluid circuit 14 connected to the busbar 1 and configured the provide a cooling fluid in said channel 5 defined by the busbar 1.

FIG. 2 is a cross-section through a conductor 4, showing how the conductor 4 is provided with electric isolation 7, 9 on opposite sides thereof, forming the electric isolation 6 that separates the individual conductors from each other and from the cooling media in the channel 5.

The invention claimed is:

1. A busbar comprising:
    two or more conductors that are each sheet-shaped,
    wherein said two or more conductors are arranged relative to each other to define an elongated body having a central channel,
    wherein each conductor has a first surface portion and a second surface portion,
    wherein each first surface portion is exposed to the central channel,
    wherein each second surface portion: (i) overlaps and abuts against at least one other conductor of the two or more conductors, such that the second surface portion of the conductor is not exposed to the central channel, and (ii) is electrically isolated from the at least one other conductor of the two or more conductors by an electric isolation, and
    wherein an area of said first surface portion of each conductor is equal to an area of the first surface portion of each of the other two or more conductors.

2. A busbar according to claim 1, wherein said busbar comprises three or more conductors and that the overlap between each pair of conductors is equal.

3. A busbar according to claim 1, wherein the body is a tubular body that has a symmetric cross-section.

4. A busbar according to claim 1, comprising three conductors and wherein the tubular body defined by said overlapping conductors has a triangular cross-section.

5. A busbar according to claim 3, wherein each conductor has parallel longitudinal edges and is folded along a centerline between said edges.

6. A busbar according to claim 5, wherein said centerline defines a corner of the triangular cross-section.

7. A vehicle comprising an electric system comprising:
    a load;
    power electronics; and
    a busbar connecting the load to the power electronics, said busbar comprising:
        two or more conductors that are each sheet-shaped,
        wherein said two or more conductors are arranged relative to each other to define an elongated body having a central channel,
        wherein each conductor has a first surface portion and a second surface portion,
        wherein each first surface portion is exposed to the central channel,
        wherein each second surface portion: (i) overlaps and abuts against at least one other conductor of the two or more conductors, such that the second surface portion of the conductor-is not exposed to the central channel, and (ii) is electrically isolated from the at least one other conductor of the two or more conductors by an electric isolation, and
        wherein an area of said first surface portion of each conductor is equal to an area of the first surface portion of each of the other two or more conductors.

8. A vehicle according to claim 7, wherein the load is a three phase load.

9. A vehicle according to claim 7, comprising a cooling fluid circuit connected to the busbar and configured the provide a cooling fluid in said central channel defined in the busbar.

10. The busbar of claim 1, wherein the area of said second surface portion of each conductor is equal to the area of said second surface portion of each of the other conductors.

11. The busbar of claim 1, wherein the first surface portion and the second surface portion of each conductor define an inner surface and each conductor further comprises an outer surface, and wherein each second surface portion overlaps and abuts against the outer surface of the at least one other conductor of the two or more conductors.

* * * * *